Figure 9:
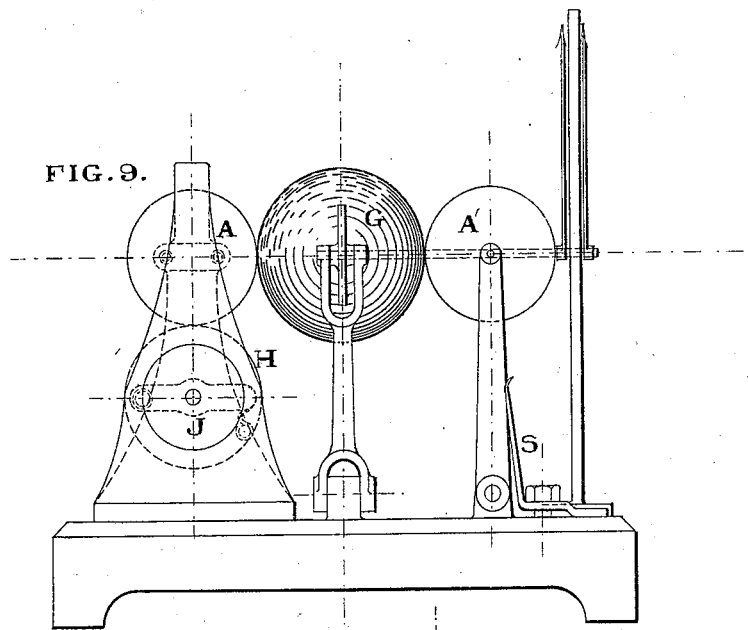
Figure 10:
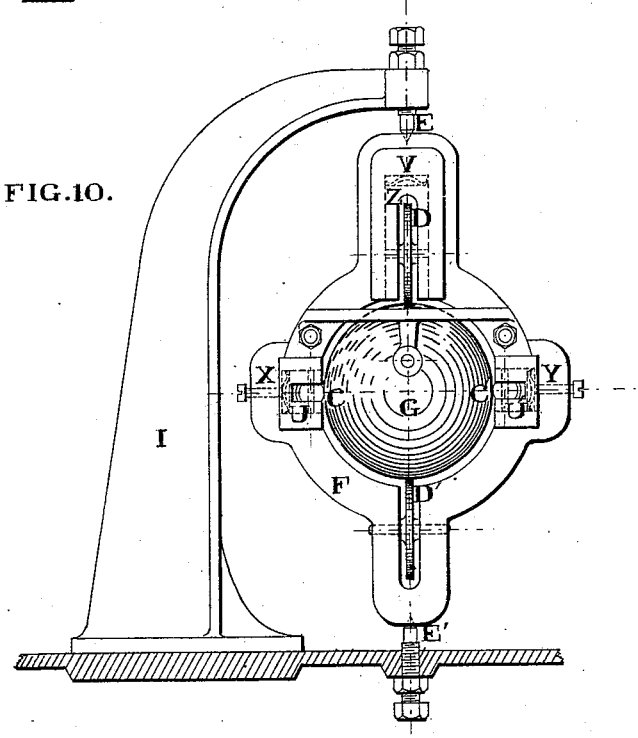

(No Model.) H. S. H SHAW. 4 Sheets—Sheet 1.
APPARATUS WHEREBY THE RELATIVE MOTIONS OF TWO OR MORE BODIES
MAY BE VARIED IN ANY REQUIRED MANNER INDEPENDENTLY
OF THEIR ACTUAL MOTIONS.
No. 312,171. Patented Feb. 10, 1885.
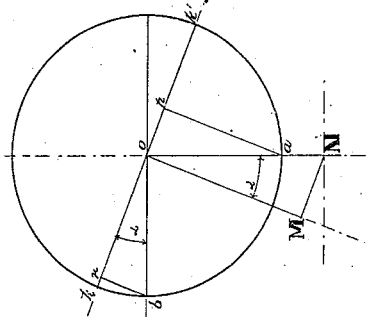
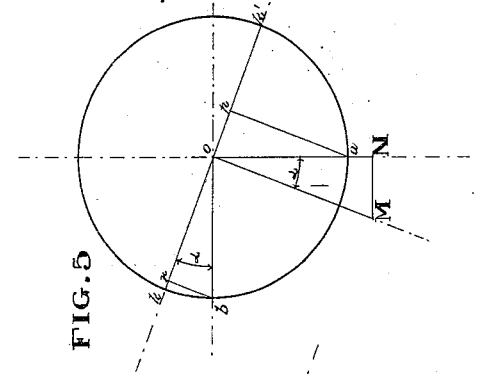
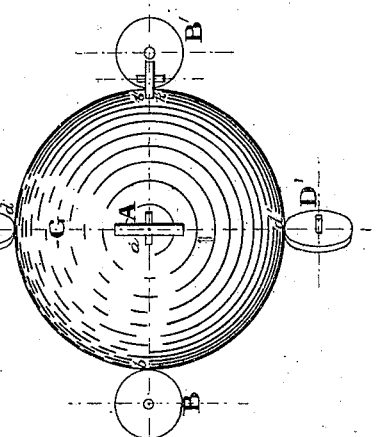
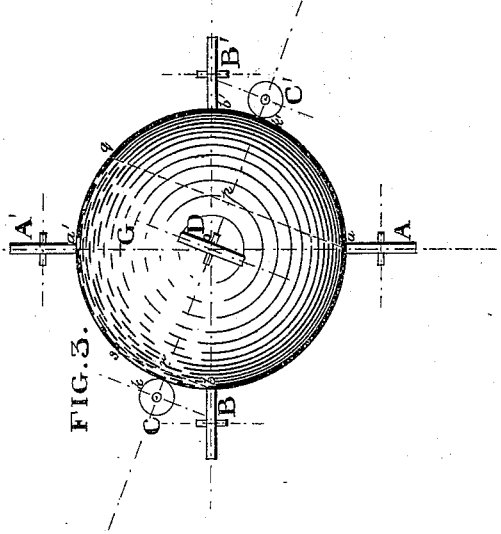
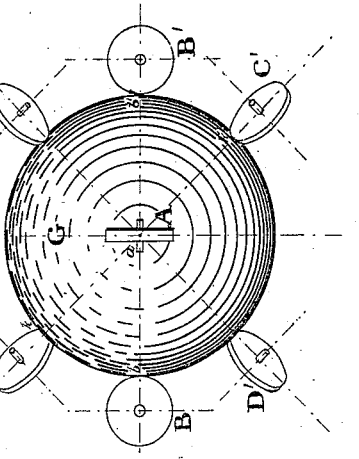
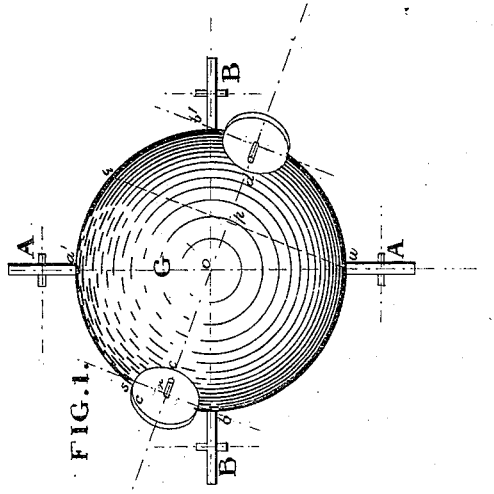
Witnesses:
J. H. Blackwood
Rhesa G. DuBois
Inventor:
Henry S. H. Shaw,
by Wm. H. Doolittle
Attorney.

(No Model.)   H. S. H. SHAW.   4 Sheets—Sheet 2.
APPARATUS WHEREBY THE RELATIVE MOTIONS OF TWO OR MORE BODIES
MAY BE VARIED IN ANY REQUIRED MANNER INDEPENDENTLY
OF THEIR ACTUAL MOTIONS.
No. 312,171.   Patented Feb. 10, 1885.
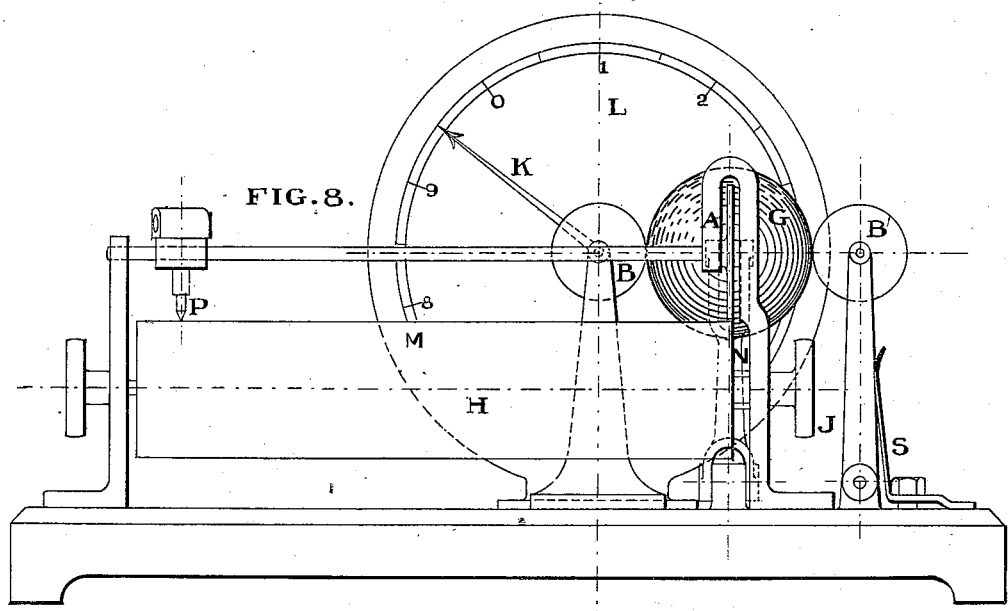
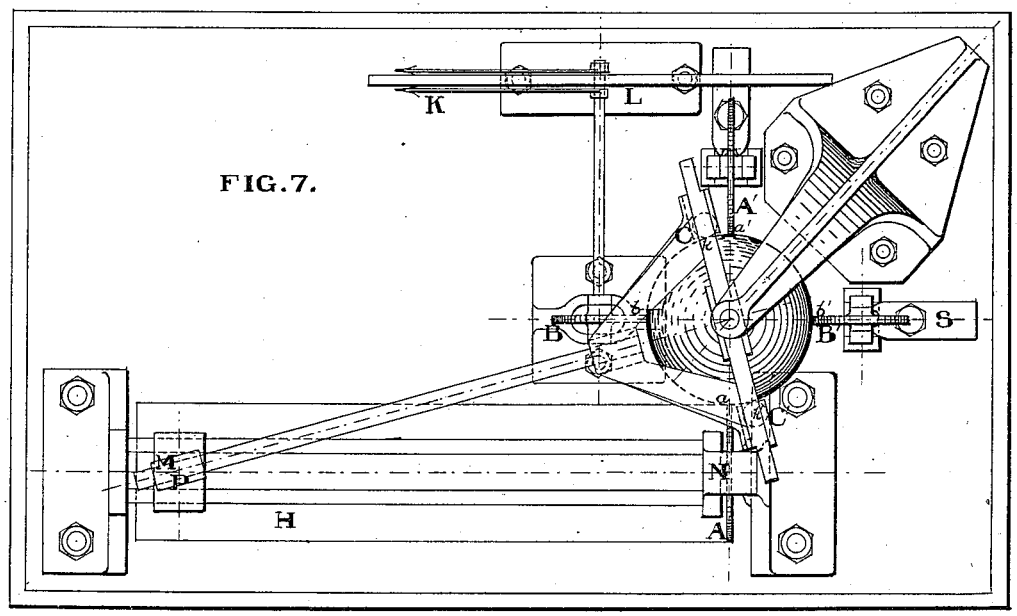

(No Model.) H. S. H. SHAW. 4 Sheets—Sheet 3.
APPARATUS WHEREBY THE RELATIVE MOTIONS OF TWO OR MORE BODIES
MAY BE VARIED IN ANY REQUIRED MANNER INDEPENDENTLY
OF THEIR ACTUAL MOTIONS.

No. 312,171. Patented Feb. 10, 1885.

Witnesses:
J. H. Blackwood
Phisa G. Du Bois

Inventor:
Henry S. H. Shaw
by Wm. H. Doolittle
Attorney.

N. PETERS, Photo-Lithographer, Washington, D. C.

(No Model.) H. S. H SHAW. 4 Sheets—Sheet 4.
APPARATUS WHEREBY THE RELATIVE MOTIONS OF TWO OR MORE BODIES
MAY BE VARIED IN ANY REQUIRED MANNER INDEPENDENTLY
OF THEIR ACTUAL MOTIONS.

No. 312,171. Patented Feb. 10, 1885.

Witnesses:
J. H. Blackwood
Rhisa G. Du Bois

Inventor:
Henry S. H. Shaw
by W. H. Doolittle
Attorney

N. PETERS. Photo-Lithographer, Washington, D. C.

UNITED STATES PATENT OFFICE.

HENRY SELBY HELE SHAW, OF BRISTOL, COUNTY OF BRISTOL, ENGLAND.

APPARATUS WHEREBY THE RELATIVE MOTIONS OF TWO OR MORE BODIES MAY BE VARIED IN ANY REQUIRED MANNER INDEPENDENTLY OF THEIR ACTUAL MOTIONS.

SPECIFICATION forming part of Letters Patent No. 312,171, dated February 10, 1885.

Application filed August 5, 1884. (No model.) Patented in France June 17, 1884, No. 162,800; in Belgium June 17, 1884, No. 65,504; in Italy June 30, 1884, XXXIII, 482; in Canada October 1, 1884, No. 20,314, and in Austria October 27, 1884, No. 23,225.

*To all whom it may concern:*

Be it known that I, HENRY SELBY HELE SHAW, a subject of the Queen of Great Britain and Ireland, residing at University College, in the city and county of Bristol, Kingdom of Great Britain and Ireland, have invented new and useful apparatus whereby the relative motion of two or more bodies may either be varied in any required manner independently of their actual motions or may be determined, of which the following is a specification.

This invention consists of a mechanical device which in its fundamental form is composed of a sphere having two sets of rollers in frictional contact therewith.

In applying the said invention the following conditions are to be observed: First, rolling motion only of the surfaces in contact must, with certain definite exceptions, be insured; second, each set of rollers is to be always in contact with a great circle of the sphere, and the imaginary diametral planes which form the two temporary great circles of the sphere by their intersection with the spherical surface must be always perpendicular to each other; third, the plane of rotation of each of the rollers should in general, but need not in all cases, contain the center of the sphere and must be perpendicular to the diametral plane of its great circle of contact. Each set of rollers is carried in a separate frame, the frames having such motion with respect to each other as to insure the relatively perpendicular position of the planes of the great circles.

The conditions above set forth being observed, each frame can have motion only about an axis lying in the plane of its own great circle and perpendicular to the plane of the great circle of the other frame at its center. If, for convenience, one frame is fixed with its great circle of contact horizontal, the other frame must be so supported as to be enabled to rotate about a vertical axis. The former may be designated the "fixed frame" and the latter the "movable frame." On the exertion of a force tending to turn one of the rollers in the fixed frame the said roller will by frictional contact tend to turn the sphere about an imaginary axis in the diametral plane of that frame, as the axes of rotation of the sphere and roller will then intersect. All the other rollers in the said frame will, except in a case hereinafter more particularly referred to, freely rotate on the sphere when it is turning about an axis in the said diametral plane, but not otherwise. The effect of the movable frame is to determine the particular axis about which the sphere, as aforesaid, tends to be turned. Inasmuch as the rollers of the movable frame are subject to similar conditions to those to which the rollers of the fixed frame are subject, the axis about which the sphere must revolve in order that the required conditions may be fulfilled is that coinciding with the line common to both the great circles of contact—that is, with the intersection of the perpendicular diametral planes. Of the rollers two only in each frame can roll at once round great circles of the sphere, the said two rollers being each equidistant from the points of intersection of the two great circles and directly opposite to each other. The other rollers, rolling on small circles of the sphere, have different relative motion or angular velocities, according to the circles on which they roll. The actual velocity of any of these said other rollers is dependent, first, upon the actual motion or angular velocity of the roller which turns the sphere, and, secondly, upon the relative position of the driving-roller and that driven with respect to the axis of rotation of the sphere. As the force exerted on the driving-roller practically produces only an effect parallel to the plane of the great circle of contact of the movable frame, no tendency to turn the said frame bodily about its vertical axis of rotation is created, and the motion of the frame is consequently independent of the motion imparted to the driving-roller, and vice versa. Thus the relative motions of the driving-roller and any other may be varied by changing the position of the frame without affecting the actual motion or angular velocity of the driving-roller, which latter may be simultaneously and independently varied in any required manner.

Conversely, by means hereinafter more particularly described, whatever relative motions or velocities two separate rollers may have, they may be made to always tend to adjust the position of the frame so as to roll upon circles of the sphere corresponding to their respective motions. Thus the position of the frame determines their relative motion or velocity ratio.

While the conditions hereinbefore set forth are fulfilled, the distribution of the rollers in their respective frames does not affect the position of the axis of rotation of the sphere, depending, as it does, upon the position of the planes of rotation of the sets of rollers relatively to each other and not to their angular distance apart.

By preserving a sufficient distance on each side between the rollers in the movable frame and the great circle of contact of the fixed frame the movable frame may be turned round through any angle without causing contact to occur between the rollers in the two frames. Should the frictional contact on the sphere of two opposite rollers of either frame coincide with the point of intersection of the two great circles of contact, through which point the axis of rotation of the sphere passes, the points of contact aforesaid then serve as temporary centers of rotation of the sphere and do not themselves turn. It is only when the movable frame assumes a limited number of certain definite positions that the aforesaid effect is produced upon two opposite rollers of the fixed frame, and the velocity ratio then has an extreme value; but when the said effect is produced upon two opposite rollers of the movable frame the said rollers always act as the centers of rotation of the sphere, and the travel of their frame is limited by them to the distance apart of two rollers of the fixed frame. Thus the said rollers of the movable frame constitute movable centers.

For the transmission of varying motion the rollers in the fixed frame are generally to be employed. One or more of the rollers of the movable frame which support the sphere may also be used for the same purpose.

Any desired number of rollers may be carried in the frames.

The said invention will be more clearly understood by reference to the accompanying sheets of illustrative drawings.

Figure 1 represents a plan, and Fig. 2 an elevation, of a sphere, G, and accompanying rollers. A A' and B B' are the rollers of the fixed frame. (Not shown.) C C' and D D' are the rollers of the movable frame. (Not shown.) The arrangement of the rollers in the movable frame is such that motion of the movable frame does not cause their contact with those of the fixed frame. The rollers A A' and B B' are respectively in contact with the sphere G at the points $a$ $a'$ and $b$ $b'$ upon the great circle formed by the intersection of the horizontal diametral plane with the sphere. The rollers C C' and D D' are in contact with the sphere G at the points $c$ $c'$ and $d$ $d'$ upon the great circle formed by the intersection of a vertical diametral plane. In turning the roller A the axis of consequent rotation of the sphere G passes through the intersection of the great circles—that is, through $k$ $k'$, Fig. 2. The roller A rotates on the circle represented by the dotted line $a$ $p$ $q$, Fig. 1. The motion of the roller A' is similar to that of the roller A. The rollers B B' having similar motion to each other, that of the roller B only requires to be considered. The circle on which the roller B rotates is represented by the dotted line $b$ $r$ $s$, Fig. 1. The ratio of the two radii $a$ $p$ and $b$ $r$ gives the relative motion or velocity ratio of the rollers A and B. By moving the frame carrying the rollers C C' and D D' about a vertical axis the radii $a$ $p$ and $b$ $r$ and the relative motion of the rollers A and B are altered. One limiting case is when by the coincidence of the axes $k$ $k'$ and $b$ $b'$ the velocity of the roller B is $nil$. The other limiting case is when the axes $k$ $k'$ and $a$ $a'$ coincide, immediately before which the velocity of the roller B would have its extreme possible relative speed.

Figs. 3 and 4 illustrate in plan and elevation a different method of disposing the rollers. The rollers C C' of the movable frame, (not shown,) being always in contact with the intersection of the great circles of the sphere, constitute movable centers. The rollers D D' form the centers of rotation of the frame, the vertical axis of the sphere passing through their points of contact therewith. Under this arrangement the range of relative motion or velocity ratio is limited to the ratio of the square of the maxima and minima values of the radii $a$ $p$ and $b$ $r$, determined by the degree of proximity which the rollers C C' can respectively assume to the rollers A B' and A' B.

Figs. 5 and 6, which represent diagrammatic plans of the apparatus, demonstrate modes of obtaining numerical results. In Fig. 5 N represents the center of the roller A, and $k$ $k'$ the temporary axis of revolution of the sphere G. O M is a perpendicular at the center O of the sphere G, meeting the axis of the roller A produced in M. Taking M N as a variable force, and the wheel A to be thereby turned through the distance through which the said force overcomes a resistance, the turning of the wheel B gives the product of the said two quantities—in other words, the work done by the force. Since M N varies as the tangent of the angle through which the frame is turned, the method of computation above set forth may be conveniently termed the "tangent method of computation." In the plan of the sphere shown at Fig. 6, M N is perpendicular to the line O M. The rollers D or D' of the movable frame may in this case be turned. The rotation of the roller B varies conjointly as the value of M N and the rotation of D or D'. Since M N varies as the sine of the angle of inclination of the frame, the method of application by which work may be measured may be conveniently termed the "sine method of computation." Conversely, if, in either of the above cases, motion by one body had been imparted to the roller B, the roller A would tend to turn by means of the sphere. If the axis of the roller A be in the form of a screw freely working in the roller A as a nut, and be driven by another body, should the relative motion or velocity ratio of the roller A and its axis not be the same, the position of M, and, therefore, of the frame, will, by the action of the screw, be so adjusted that the velocity ratio of the roller A and its axis becomes the same; hence the position of M indicates or determines the relative motion or velocity ratio of the two bodies. In place of the arrangement of which the screw forms a part, a connection may be made by wheel-work or by levers, or by any other suitable means. If, instead of the actual quantity, the trigonometrical ratio of an angle were given as one of the variable quantities, the methods set forth with reference to Figs. 5 and 6 allow this to be obtained by a suitable arrangement in connection with the angle of the frame—that is, of the axis of revolution $k\ k'$.

Figs. 7, 8, 9, and 10 represent different views of parts of the sphere and roller mechanism, and illustrate its application, wherein the rollers in the movable frame are upon the great circle of the rollers of the other frame. This application is adapted for the mechanical integration of areas. By the addition of one more set of sphere and rollers it is adapted for the determination simultaneously of the statical moment of an area. With two additional sets of sphere and rollers it is adapted to the determination simultaneously of the moment of inertia of the area about a given line. The elevation of the movable frame F is, with its supporting-bracket I, shown apart at Fig. 10 from the rest of the mechanism. The frame F is free to rotate bodily about the vertical axis on the centers E E'. In the integration of areas the paper upon which is represented the area to be integrated is wound about the drum or cylinder H, Figs. 7, 8, and 9, and the roller A bears upon it. As the drum or cylinder H is caused to rotate by turning the milled wheel J, Fig. 8, the roller A revolves, and motion is thereby imparted to the sphere G and transmitted to the roller B, the motion of which for a given movement of the roller A depends upon the position of the axis of rotation of the sphere G—that is, upon the position of the movable frame. The line $k\ k'$, Fig. 7, corresponds to the said axis, which depends upon the position of M, corresponding, when the movable frame is in its place, to the position of the pointer P. The pointer P is made to continuously coincide with the boundary of the area to be integrated, and by the combined effect of the position of the frame, regulated by the pointer P, and the motion of the roller A across the curve the area is directly given by the distance turned through by the roller B and measured by the hand or pointer K upon the dial L. The pressure exerted by the rollers A A' and B B' upon the sphere is adjusted by means of the springs S S, Figs. 7, 8, and 9. The adjustment of the rollers C C' and D D' of the movable frame is effected by means of the sliding bearings U, U', and V and the corresponding springs X, Y, and Z. (Seen at Fig. 10.) By a modification of this mechanism the continuous product of any two quantities—one increasing in value according to the rotation of the roller A, (the abscissa,) and the other proportional to the distance or corresponding ordinate, M N—may be obtained, whether the product be work done ($f\ \mathrm{F}\ d\ s$) or any other quantity. Conversely, by causing M to be moved by a screw turned instead of the roller A, through which it passes as a nut, while the roller B is being turned independently by another moving body, the relative motion of A and B, or their velocity ratio, is given by the position of the pointer P or the point M. (Shown on a suitable scale.) The relative value or quotient of any two quantities may thus be obtained.

By means of the arrangement above described of the sphere and rollers a range of relative motion or velocity ratio sufficient for a variety of purposes may be obtained. The sphere must be of such a nature that the edges of the disks C C' may twist upon the surface to which they act as centers of revolution. The rollers D D' have the same relative motion.

Figure 11:
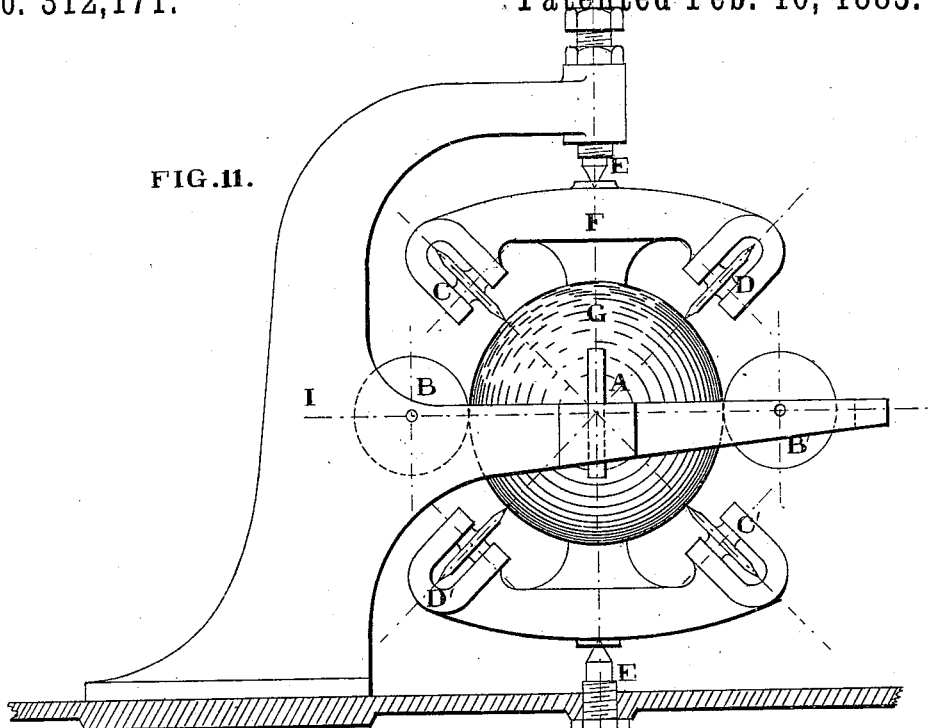
Figure 12:
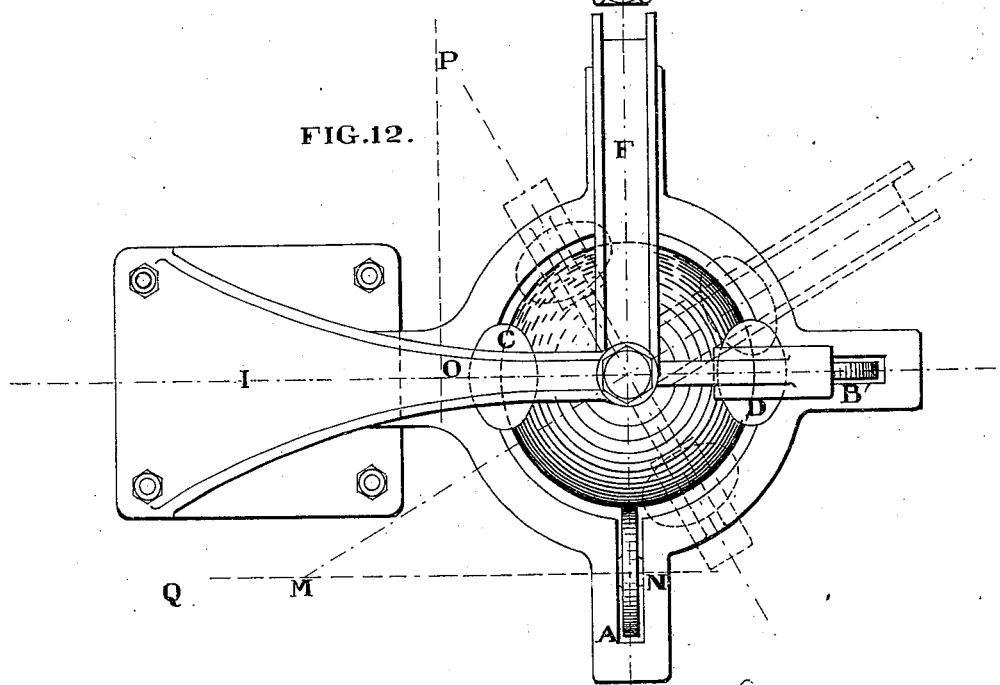

In Figs. 11 and 12, which represent the more general form of arrangement of the mechanism, the rollers, of which more than the four shown may, if required, be employed, are so disposed as to avoid twisting of the surface of the sphere in contact with them, so that only rolling of the sphere and rollers occurs. Under this arrangement, in which the principle of action is the same as that of the arrangement hereinbefore described, extreme range of relative motion or velocity ratio is possible. At Fig. 11 is shown the elevation of the frame F, working on the centers E E' about a vertical axis, and in such a position that the motion or velocity of the roller B is infinitely small compared with that of the roller A. At Fig. 12 is shown the frame F in plan and its supporting-bracket I. The dotted lines indicate the position of the frame which causes a relative motion of the rollers A and B measured by the distance M N. By varying the position of the point M the axis N Q may be made to transmit any required motion to the axis O P. Conversely, if N Q be the axis in the form of a screw passing through the roller A as a nut, the position of the point M may be made to indicate the relative motion or angular velocities of the body the motion of which corresponds with the motion of the screw, and the body the motion of which corresponds with the motion of the roller B.

By this invention the relative motion or velocity ratio of two bodies in motion may be varied in any desired manner without requiring the surfaces through which the motion is transmitted to slip over each other, as required, for instance, in the case of the disk and roller mechanism. Thus, since nothing but rolling motion is required, the normal pressure of the surfaces in contact may be considerably reduced, since the edge of the disks, rollers, or wheels may be milled, serrated, or furnished with teeth, so as to impress temporarily a corresponding toothed envelope upon the surface of the sphere, which may be made of suitable material for this purpose. The mechanism is therefore suitable for employment in such appliances as dynamometers, continuous indicators, governors, horse-power, and efficiency indicators, not only for ordinary prime movers, but with electric motors and transmitters, and also for transmitting force. Again, since there is no motion not coinciding with the plane of rotation of the rollers, one source of error in devices of an analogous kind is avoided. The mechanism is therefore suitable for mathematical purposes of the greatest accuracy, both for processes of summation and differentiation, and also may be applied to other mathematical purposes where logarithms and roots are required. The symmetrical disposition of the moving parts enables the normal pressure of the rollers transmitting power to be balanced by the opposite rollers. Therefore, the pressure due to this cause is taken off, instead of acting, as it otherwise would, upon the system which serves as a bearing upon which the sphere rotates. These opposite rollers may, if desired, be employed simultaneously to transmit or receive motion.

What I claim is—

1. An apparatus for determining or for varying the relative motion of two or more bodies in any required manner independently of their actual motions, consisting of a sphere in combination with sets of rollers held in frictional contact with the said sphere, substantially as described.

2. In an apparatus of the character above described, the combination of the sphere and two sets of rollers in contact with the sphere, and having their axes of revolution in two diametral planes respectively perpendicular to each other, whereby the sphere can only revolve about the intersection of these diametral planes as axis, substantially as and for the purpose described.

3. In an apparatus of the character above described, the fixed frame provided with the roller or rollers, in combination with the movable frame provided with the roller or rollers and the sphere, substantially as and for the purpose described.

4. The combination of the sphere and the two sets of rollers, one roller in one set of which is a graduated wheel or disk, and a roller in the same set provided with a screw-axis, substantially as and for the purpose described.

5. The combination of the rods and swivel or cross joints, and screws suitably arranged in connection with one or more spheres and sets of rollers, so that numerical results are obtained with the sphere and the roller mechanism, substantially as hereinbefore set forth and illustrated.

HENRY SELBY HELE SHAW.

Witnesses:
   JAMES WILLIE CUNDALL,
      *Shannon Court, Bristol, Accountant.*
   CHARLES COLEMAN,
      *Shannon Court, Bristol, Clerk.*